United States Patent
Naumov et al.

(10) Patent No.: US 11,873,433 B2
(45) Date of Patent: Jan. 16, 2024

(54) NEAR-INFRARED EMISSIVE GRAPHENE QUANTUM DOTS METHOD OF MANUFACTURE AND USES THEREOF

(71) Applicant: Texas Christian University, Fort Worth, TX (US)

(72) Inventors: Anton V. Naumov, Arlington, TX (US); Tanvir Hasan, Fort Worth, TX (US)

(73) Assignee: Texas Christian University, Fort Worth, TX (US)

(*) Notice: Subject to any disclaimer, the term of this patent is extended or adjusted under 35 U.S.C. 154(b) by 198 days.

(21) Appl. No.: 17/249,331

(22) Filed: Feb. 26, 2021

(65) Prior Publication Data

US 2021/0269711 A1    Sep. 2, 2021

Related U.S. Application Data

(60) Provisional application No. 62/983,191, filed on Feb. 28, 2020.

(51) Int. Cl.
| | |
|---|---|
| *C09K 11/65* | (2006.01) |
| *C01B 32/184* | (2017.01) |
| *B82Y 40/00* | (2011.01) |
| *B82Y 20/00* | (2011.01) |

(52) U.S. Cl.
CPC ............ *C09K 11/65* (2013.01); *C01B 32/184* (2017.08); *B82Y 20/00* (2013.01); *B82Y 40/00* (2013.01)

(58) Field of Classification Search
CPC ....... C09K 11/65; C01B 32/184; C01B 32/15; B82Y 20/00; B82Y 40/00
See application file for complete search history.

(56) References Cited

U.S. PATENT DOCUMENTS

| | | | | |
|---|---|---|---|---|
| 10,800,971 B1* | 10/2020 | Liu | ................ | C09K 11/0883 |
| 2015/0298977 A1* | 10/2015 | Yoon | ................ | C01B 32/198 |
| | | | | 204/157.43 |
| 2018/0086976 A1* | 3/2018 | Wang | ................ | C09K 11/65 |
| 2019/0330066 A1* | 10/2019 | Hsieh | ................ | C01B 32/21 |

FOREIGN PATENT DOCUMENTS

CN          108455578          *  8/2018

OTHER PUBLICATIONS

Hasan, Dr. Tanvir, Md. et al; "Near-infrared emitting graphene quantum dots synthesized from reduced graphene oxide for in vitro/in vivo/ex vivo bioimaging applications"; IOP Publishing Ltd; Apr. 6, 2021; pp. 1-17; 2D Mater. 8 (2021) 035013.
Hasan, Dr. Tanvir, Md. et al; "Rare-Earth Metal Ions Doped Graphene Quantum Dots for Near-IR In Vitro/In Vivo/Ex Vivo Imaging Applications"; Adv. Optical Mater. 2020, 8, 2000897; Aug. 16, 2020; pp. 1-12; Wiley-VCH; Germany.
Liping, Lin et al; "Europium-decorated graphene quantum dots as a fluorescent probe for label-free, rapid and sensitive detection of Cu2+ and I-cysteine";—ScienceDirect; Sep. 3, 2015; pp. 261-268; vol. 891; Elsevier BV.
Trung,Viet Huynh et al; "Erbium-doped graphene quantum dots with up- and down-conversion luminescence for effective detection of ferric ions in water and human serum"; ScienceDirect; Feb. 1, 2021; vol. 328;Elsevier B.V., pp. 1290561-1 to 129056-11.
Zhang, Dandan et al; "Mitochondrial specific photodynamic therapy by rare-earth nanoparticles mediated near- Infrared graphene quantum dots"; ScienceDirect; Jan. 2018; pp. 14-26; vol. 153; Elsevier B.V.

* cited by examiner

*Primary Examiner* — C Melissa Koslow
(74) *Attorney, Agent, or Firm* — WHITAKER CHALK SWINDLE & SCHWARTZ PLLC; Charles D. Gunter, Jr.

(57) ABSTRACT

The present disclosure comprises graphene quantum dots that exhibit emission in the near-infrared region in response to a variety of excitation wavelengths. The exciting wavelengths may be in the visible region, near-infrared region, or both. The quantum dots may be synthesized via a top-down method or a bottom-up method. The quantum dots are useful in imaging, drug delivery, and biosensing. The quantum dots comprise carbon, oxygen, hydrogen, nitrogen, and metal atoms in various combinations.

9 Claims, 15 Drawing Sheets

NEAR-INFRARED EMISSIVE GRAPHENE QUANTUM DOTS METHOD OF MANUFACTURE AND USES THEREOF

CROSS-REFERENCE TO RELATED APPLICATION

The present application claims priority to U.S. Provisional Patent Application Ser. No. 62/983,191 filed Feb. 28, 2020, by the same inventor and with the same title.

BACKGROUND

1. Field of the Disclosure

The present invention relates generally to near-infrared emissive graphene quantum dots and, more specifically, to such graphene quantum dots which exhibit fluorescence in the near infrared regions in response to various excitation wavelengths, and uses thereof.

2. Background of the Disclosure

In recent years, nanomaterials-based nano-formulations have received more attention as potential agents for drug/gene delivery and bioimaging applications. These formulations may have the potential to effectively deliver therapeutics to biological cells and tissues, enhancing the efficacy and biocompatibility of such therapeutics. Additionally, nanomaterials often provide a large platform for covalent/non-covalent functionalization of both drugs and targeting agents and often enable fluorescence tracking; such qualities provide a multifunctional alternative to facilitate drug transport, biological imaging, and even biosensing.

However, in addition to high production costs and complex synthesis procedures, many nanomaterials are limited in use for fluorescence tracking because they exhibit emissions only in the visible region of the electromagnetic spectrum, often only in response to UV/VIS excitation. The requirement of UV/VIS excitation and limitation of emissions in the same range are both problematic. Because human tissues have many organic molecules that absorb and emit light in the UV/VIS range (e.g. DNA, certain proteins, NADH, etc.), there is high autofluorescence background from biological specimen in response to UV/VIS excitation which can overlap or interfere with the emissions from the nanomaterials. Additionally, due to absorption and scattering, UV/VIS excitation has low penetration depth, rendering it suitable only for in vitro applications. As a result, to enable in vivo imaging when using a nano-formulation that only emits UV/VIS light in response to UV/VIS excitation, attaching either an MRI or CT contrast agents is usually required; however, such contrast agents add to the toxicity profile of the formulation, which is concerning for patient health.

Because of these problems with using UV/VIS for excitation, it is generally preferred to use light in the near-infrared (NIR) region of the spectrum for excitation in biomedical applications if possible—light in the NIR region has improved tissue penetration and a reduced autofluorescence (i.e. less light is emitted from biological material in response to NIR region excitation); for the same reasons, it is also desirable for emission wavelengths to be in the NIR region. There are some nanomaterials such as single-walled carbon nanotubes (SWCNTs) that are known to exhibit emission in the NIR-I (650-1000 nm) and NIR-II (1000-1450 nm) regions. The emission in this range yields a broader spectrum of potential applications as NIR light experiences substantially lower scattering and absorption in tissues, while the biological autofluorescence in that region is minimal. Such NIR emissive nanomaterials can be utilized even for low/medium depth in vivo applications. However, the biocompatibility of SWCNTs is highly dependent on the coating of the SWCNT, and in some formulations, SWCNTs may lead to potential immunogenic responses and accumulation-derived toxicity, which is not ideal for the therapeutic delivery or patient health. Besides SWCNT, NIR I/II emitting quantum dots such as PbS/CdS/CdSe can also be used for in-vitro/in-vivo NIR fluorescence tracking, but their complex synthesis process, along with detrimental effects on the environment and biotoxicity, make them unsuitable for large scale biological imaging applications.

Therefore, it is highly important to develop materials that will have low production costs, high production yield, simple/scalable synthesis processes, excellent water solubility, and high biocompatibility. Moreover, these desired materials should exhibit emission in the NIR region for bioimaging applications to reduce background autofluorescence, possess large enough platforms to attach drugs/genes for therapeutics, and quickly accumulate in the targeted area followed by a fast excretion from the biological subject.

SUMMARY

The present disclosure relates to graphene quantum dots which exhibit emission in the near-infrared region in response to a variety of excitation wavelengths. These excitation wavelengths can be in the visible region, the near-infrared region, or both. The dots can be synthesized via a top-down approach or by a bottom-up approach.

Thus, in one embodiment, graphene quantum dots can be prepared by the following steps, in a top-down method: adding a graphene source to a vessel; homogenously suspending the graphene source in a solvent to form a reaction mixture; adding an oxidant to the reaction mixture; and irradiating the reaction mixture. In one embodiment, the graphene quantum dot formed exhibits fluorescence emission in the near-infrared region.

In another embodiment, the graphene source can conveniently be selected from the group consisting of graphite, graphene, graphene oxide, and reduced graphene oxide. The solvent used can be water. One preferred oxidant is sodium hypochlorite.

In another embodiment, the graphene quantum dots formed via this method can have a diameter between 1 nanometer and 10 nanometers. In one embodiment, the graphene quantum dots thus formed can also be characterized as having an atomic percentage of carbon ranging from 50% to 90% and an atomic percentage of oxygen ranging from 10% to 50%.

In another preferred method of manufacture, graphene quantum dots can be prepared by the following steps in a bottom-up method: adding an organic starting material to a vessel, wherein the organic starting material is a cyclic and water-soluble compound containing at least carbon, hydrogen, and oxygen; dissolving said organic starting material within the vessel in a solvent to form a reaction mixture; adding a metal-containing compound to the reaction mixture; and exposing the reaction mixture to microwave radiation. The doped graphene quantum dot formed can exhibit fluorescence emission in the near-infrared region.

In another embodiment, the organic starting material used in this method of manufacture can be selected from the group consisting of glucose, glucosamine hydrochloride, and ascorbic acid. In another example, the solvent can be water. The metal-containing compound used in this version of the method can be soluble in the solvent. The metal-containing compound can be selected from the group consisting of neodymium (III) nitrate hexahydrate or thulium (III) acetate tetrahydrate.

In another embodiment, a doped graphene quantum dots formed via this method can have a diameter between 2 nanometers and 20 nanometers. The graphene quantum dots formed via this method can also characterized as having an atomic percentage of carbon ranging from 50% to 99.5%, an atomic percentage of oxygen ranging from 0.5% to 50%, an atomic percentage of nitrogen ranging from 0% to 50%, and an atomic percentage of a metal ranging from 0% to 20%.

In another embodiment, the present invention can encompass a novel form of graphene quantum dot which comprises: carbon atoms; oxygen atoms, wherein oxygen atoms can be present within the graphene quantum dot at an atomic percentage between 0.5% and 50%; nitrogen atoms, wherein nitrogen atoms can be present within the graphene quantum dot at an atomic percentage between 0% and 50%; and rare earth metal atoms, wherein Rare Earth metal atoms can be present within the graphene quantum dot at an atomic percentage between 0% and 20%; wherein the graphene quantum dot can exhibit emission in the near-infrared region.

In another embodiment, a rare earth metal which can be present can be neodymium at an atomic percentage of at least 0.001%. The rare earth metal can also be thulium at an atomic percentage of at least 0.001%. The graphene quantum dots of the invention can also be characterized as having an emission which is excitation-independent. For example, the emission can be in response to an excitation wavelength in the near-infrared region. However, the emission can also be in response to an excitation wavelength in the visible region.

The novel graphene quantum dots of the invention can also be characterized as including: carbon atoms; hydrogen atoms; and oxygen atoms, wherein oxygen atoms can be present within the graphene quantum dot at an atomic percentage between 0.5% and 50%; wherein the graphene quantum dot can exhibit emission in the near-infrared region.

Additional objects, features and advantages will be apparent in the written description which follows.

BRIEF DESCRIPTION OF THE DRAWINGS

The figures disclosed herein show representative and non-limiting embodiments of the present disclosure and are briefly described below.

DETAILED DESCRIPTION

Figure 1:
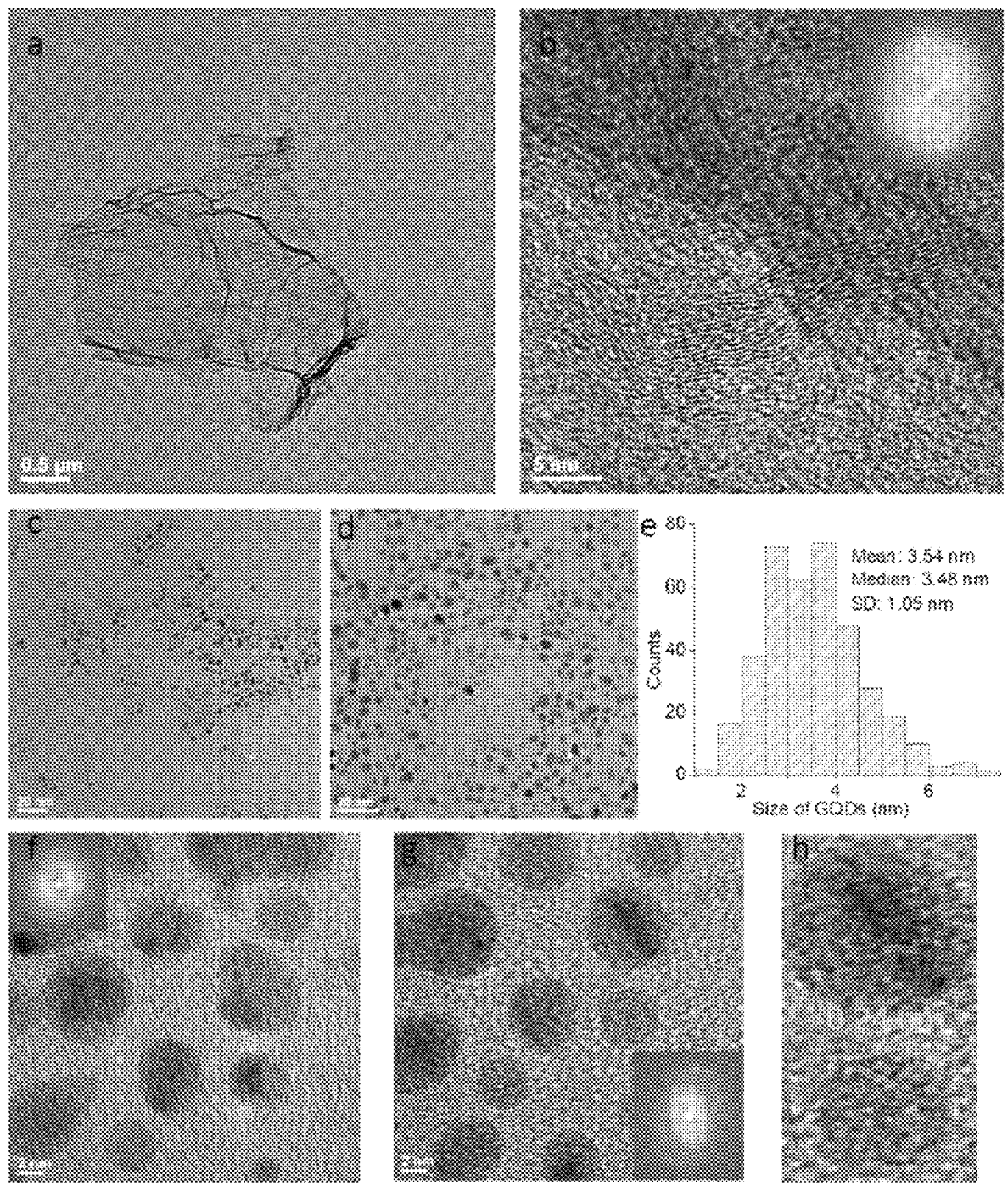
FIG. 1: (a) TEM images of more than micron sized reduced graphene oxide (RGO); (b) HRTEM images of RGO. Inset: FFT images of the chosen area; (c,d) TEM images showing the distribution of reduced-graphene-oxide-derived graphene quantum dots (RGQDs); (e) size distribution of RGQDs; (f,g) HRTEM images of RGQDs. Inset: FFT images of the chosen area; (h) separation between lattice fringes.

In the Summary of the Invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a a particular claim, that feature can also be used, to the extent possible, in combination with and/or in the context of other particular aspects and embodiments of the invention, and in the invention generally.

Where reference if made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

Terms that traditionally infer a sequential order, such as "first" or "second" or"third", are used to distinguish one element from another element and are not necessarily meant to denote that an element is the primary or initial element in any given sequence of elements. For example, "a first molecule" does not necessarily signify that the molecule is the first in a sequence of molecules or the first molecule to be changed or modified by a method or apparatus. Instead, "a first molecule" may only indicate that the molecule is separate and distinguishable from another molecule, such as "a second molecule" or "a third molecule."

The preferred version of the invention presented in the following written description and the various features and advantageous details thereof are explained more fully with reference to the non-limiting examples included and as detailed in the description which follows. Descriptions of well-known components and processes and manufacturing techniques are omitted so as to not unnecessarily obscure the principal features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

In one embodiment, the present disclosure comprises a graphene quantum dot of carbon and oxygen, wherein the dot exhibits emission in the NIR region. In another embodiment, the present disclosure comprises a graphene quantum dot of carbon, oxygen, nitrogen, and a metal component, wherein the dot exhibits emission in the NIR region. In one embodiment, the graphene quantum dots disclosed herein comprise a graphene lattice structure.

In another embodiment, the present disclosure comprises a method of synthesizing graphene quantum dots (GQDs) from reduced graphene oxide, such quantum dots synthesized by this method referred to as reduced graphene oxide (RGO)-derived graphene quantum dots (RGQDs). RGQDs can be synthesized via a top-down method using RGO as a carbon precursor.

In another embodiment, the present disclosure can comprise Rare-Earth metal doped quantum dots prepared via a bottom-up approach using glucosamine for the carbon precursor and Neodymium (III) nitrate hexahydrate/Thulium (III) acetate tetrahydrate for $Nd^{3+}$/$Tm^{3+}$ doping, respectively.

The below examples are preferred embodiments of the disclosure.

Example 1: Synthesis of Graphene Quantum Dots from Reduced Graphene Oxide Via a Top-Down Approach A commercially available graphene source, in this embodiment, high porosity reduced graphene oxide (RGO) (purchased from graphene supermarket, HP-RGO-0.5G) was suspended into water at a concentration of 0.20 mg/ml via direct probe ultrasonic treatment (QSonica, Q55) under iced-bath condition for one hour at 22 W. An oxidant, here 1.5 ml of 5% w/v sodium hypochlorite (NaClO, CAS 7681-52-9) was mixed in 20 ml aqueous RGO suspension followed by two hours of ultraviolet (UV) irradiation at 302 nm utilizing a benchtop 3 UV transilluminator (LMS-20, 8 W) UV source. The NaClO decomposes at a higher rate under UV irradiation, generating oxygen radicals [O] to react with the RGO surface, resulting in graphene quantum dots (RGQDs). These GQDs were dialyzed in DI water using a molecular-weight-cutoff (MWCO) 1 KDa bag for 24 h in order to remove sodium ions and other non-reactant materials. The DI water was changed every after 30 min for the first three hours followed by changing the water every after seven hours. The dialyzed RGQDs were filtered using a 0.22 μm syringe filter to discard the bundles/large clusters of RGQDs.

Example 2: Synthesis of Nd (Neodymium)/Tm (Thulium) Doped Graphene Quantum Dots Via a Bottom-Up Approach A commercially available microwave oven (Hamilton Beach, model: HB-P90D23AP-ST) was used to perform a microwave-facilitated hydrothermal reaction. In a standard procedure, 0.04M aqueous solution of glucosamine hydrochloride (Sigma-Aldrich batch #104K0082) and either 0.008M aqueous solution of $Nd(NO_3)_3 \cdot 6H_2O$ (Neodymium (IM) nitrate hexahydrate 99.9% trace metal basis, Sigma-Aldrich Lot #MKCH8576) or 0.009M aqueous solution of $Tm(O_2C_2H_3)_3 \cdot 4H_2O$ (Thulium (III) acetate tetrahydrate, Chem Craft Ltd., CAS:207738-11-2) was processed inside the microwave oven for 60 min at between 1000-2000 W (in this embodiment, 1350 W (power level 3)) in order to produce Nd-GQDs/Tm-GQDs. The samples were further processed in order to remove the non-reactant precursors via a molecular-weight-cutoff (MWCO) 1 KDa bag dialysis for 24 h against DI water which was changed every 30 min for the first three hours followed by changing the water every seven hours. This purified sample was further filtered using a 022 µm syringe filter in order to remove any big clusters/bundles. In other embodiments, the metal-consisting compound can any form of Lanthanide salts.

Example 3: Structural/Optical Characterization

The morphological characterization of the GQDs synthesized by a top-down/bottom-up approach was performed using HRTEM (High-Resolution Transmission Electron Microscope, JEOL JEM-2100). For the TEM measurements, the samples were prepared on the carbon-coated 200-mesh copper grid under ambient conditions. The photoluminescence spectra of Nd/Tm doped GQDs and RGQDs were measured utilizing Horiba Scientific SPEX NanoLog. The absorbance of $Nd^{3+}/Tm^{3+}$ doped GQDs and RGQDs samples were measured within the range of 200-1000 nm using Agilent Technologies (Cary 60 UV-vis) absorption spectrometer. RGQDs graphitic structure was characterized using a DeltaNu Raman spectrometer with 785 nm excitation at 100 mW maximum power. The quantum yield of the RGQDs was determined using a Newport 819C-SL integrating sphere with Spectralon coating. Fluorescence microscopy was performed using an Olympus IX73 fluorescence microscope with 60× (IR-corrected Olympus Plan Apo) water immersion objective coupled to the NIR detector InGaAs Photon etc (ZEPHIR™ 1.7), which is connected to a hyperspectral fluorescence imager (Photon etc.) to enable spectrally-resolved imaging in the near-infrared region.

Example 4: Cell Culture

HeLa cell lines were maintained in a Thermo-Scientific Midi 40 $CO_2$ Incubator at 37.1° C. with 5% carbon dioxide and 95% air. In order to prepare the glass coverslips for microscopy imaging, they were placed at the bottom of 6-well plates followed by adding cells in the media. Nd-GQDs and Tm-GQDs were added at a concentration of 1 mg/mL and 0.25 mg/ml respectively in each well after 4 hours of cell attachment to the coverslips. 0.5 mL of PBS (phosphate-buffered saline) was used to wash the cells in order to remove any extracellular GQDs, followed by fixing them with 4% paraformaldehyde at room temperature for 30 min. After that, the cell samples were washed again with 0.5 mL of PBS for the microscopy imaging. Transfection points 12 h were used for imaging with 1 mg/mL of Nd-GQDs and 0.25 mg/ml of Tm-GQDs added to each well.

Example 5: MTT Assays

MTT cytotoxicity assays were used to assess the cytotoxicity of RGQDs/Nd-GQDs/Tm-GQDs. HeLa cells were plated in a 96-well plate with 5000 cells per well (100 µL/well) and kept in an incubator overnight at 37.1° C. while maintaining the $CO_2$/air ratio of 1:19. After 24 h of incubation, the samples were added into each well at different concentrations for different materials (0 to 70 µg/mL, 1 mg/ml, 0.25 mg/ml for RGQDs, Nd-GQDs, Tm-GQDs, respectively). After 24 h of incubation, the medium was replaced by 100 µL of 1 mg/mL thiazolyl blue tetrazolium bromide. After 4 h of further incubation, MTT (3-(4-dimethylthiazol-2-yl)-2,5-diphenyltetrazolium bromide) was replaced with 100 µL of DMSO (dimethyl sulfoxide) to solubilize the precipitation. Reduction in MTT influences the metabolic activity of living cells, which can be assessed with absorbance measurements because living cells metabolize the MTT and form a highly absorbing purple colored byproduct known as formazan. The absorbance (essentially the cell viability) of the final sample was measured at 540 nm wavelength using the FLUOstar Omega microplate reader.

Example 6: Fluorescence Microscopy Measurements

In vitro fluorescence microscopy of RGQDs was performed using an Olympus IX73 fluorescence microscope with 60× (IR-corrected Olympus Plan Apo) water immersion objective coupled to two detectors: visible Hamamatsu Image EMCCD camera spectrally filtered by 10 filters throughout the visible and the NIR InGaAs Photon etc (ZEPHIR™ 1.7) camera connected to a hyperspectral fluorescence imager (Photon etc.) enabling spectrally-resolved imaging in the near-infrared: 900-1600 nm.

Example 7: Imaging in the Visible Region

Intracellular green (~532 nm) emission of RGQDs was measured with 460±25 nm (lamp) excitation and 550±20 nm emission filters. The integration time and lamp intensity settings were chosen such to ensure zero autofluorescence emission from non-treatment control cells, and the same settings were further used for RGQDs fluorescence imaging.

Example 8: Imaging in the NIR Region

The NIR-1 fluorescence of RGQDs was imaged with CW 808 nm (150 mW output power) diode laser excitation in HeLa cells with InGaAs Photon etc. (ZEPHIR™ 1.7) camera and near-IR hyperspectral imager (Photon etc. IMA-IR™), allowing for the capture of full spatial information while simultaneously utilizing a Bragg grating imaging filter collecting spectral information, thus providing spectrally-resolved imaging in the region of 900-1600 nm. Control cell sample without RGQDs imaged with the same setup showed no emission in the near-IR region.

Example 9: RGQDs (GQDs Prepared from Reduced Graphene Oxide Via Top-Down Approach)

Figure 2:
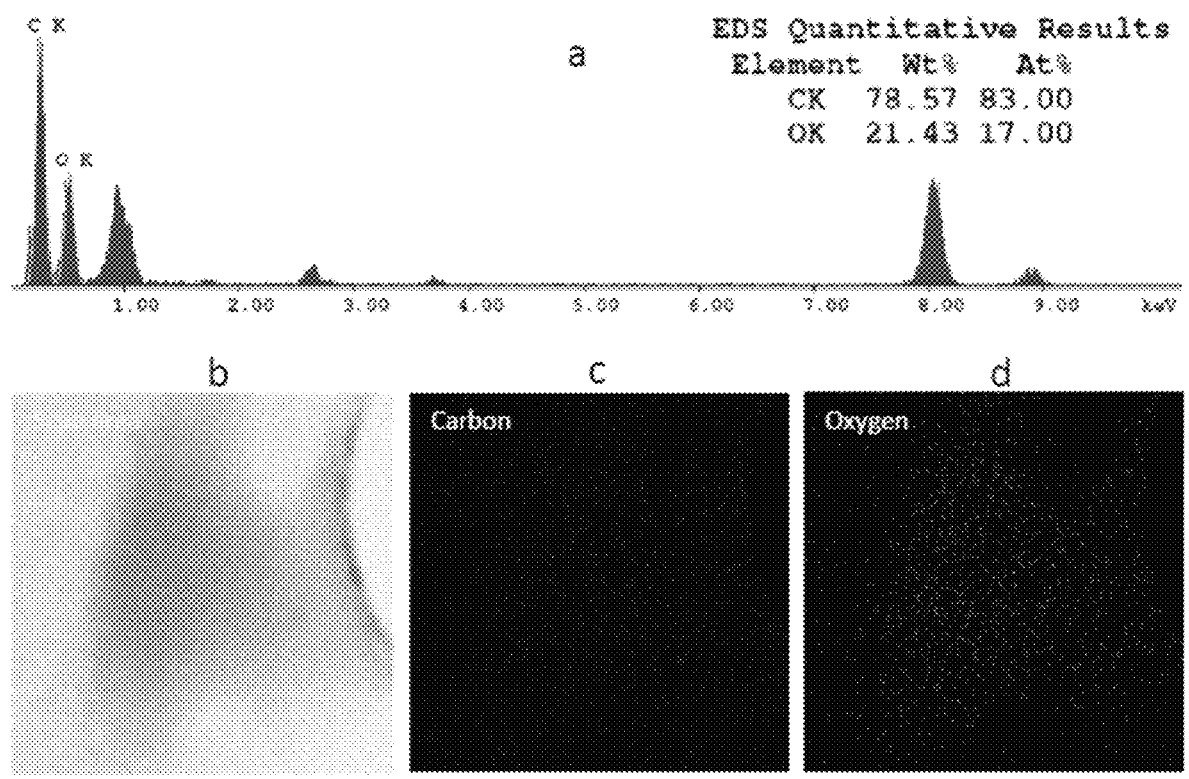
FIG. 2: (a) EDX spectra of RGQDs. Inset: Atomic/weight percentage of Carbon and Oxygen; EDX mapping of RGQDs showing (b) scan area, the presence of (c) Carbon, and (d) Oxygen.
Figure 3:
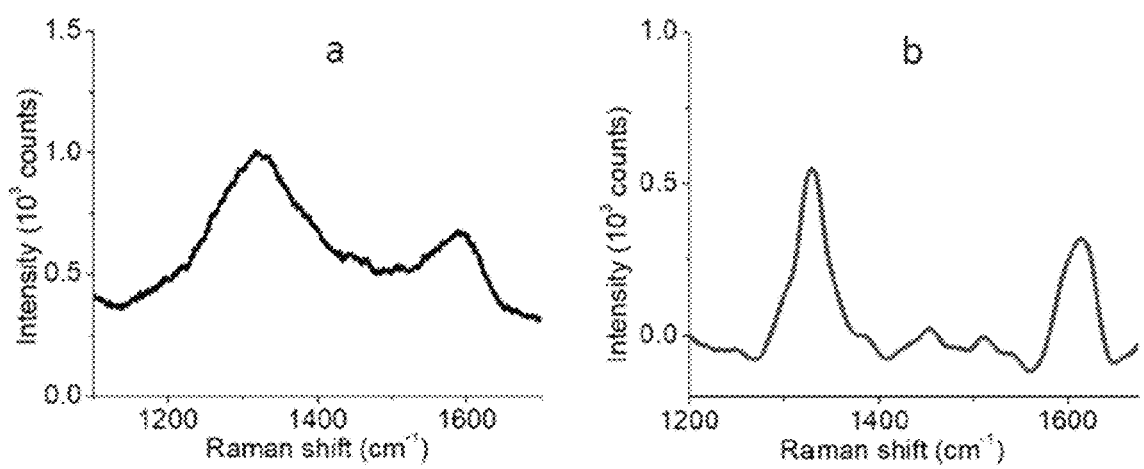
FIG. 3 shows Raman spectra of (a) RGO, and (b) RGQDs.
Figure 5:
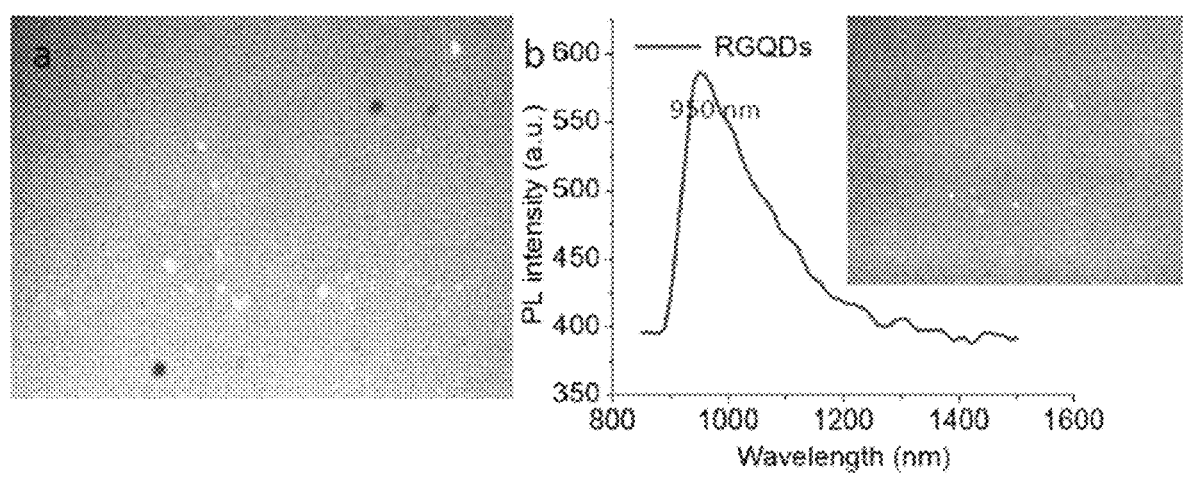
FIG. 5 shows NIR hyperspectral fluorescence images of RGQDs utilizing the (a) broadband mode, (b) inset: bandpass mode. Recovery of the spectra from the fluorescence images showing NIR emission peaking at 950 nm.

A top-down approach is utilized to produce nanometer-sized GQDs from commercially available, larger-than-micron-sized RGO (FIG. 1a,b). Upon adding sodium hypochlorite (NaOCl) into aqueous RGO, the decomposition of NaOCl takes place followed by the generation of highly oxidative free radical [O]. The reaction rate can be increased significantly upon the irradiation of ultraviolet (UV) light because high energy UV illumination expedites the decomposition of NaOCl yielding a higher number of free radical [O] at a much faster rate. Although RGO is a reduced form of graphene oxide (GO), it still has some defects on its surface, which are likely to be the most vulnerable regions for the reaction. Due to this chemical reaction, oxidation cutting takes place on the RGO surface, yielding nicely dispersed and well-distributed GQDs (FIG. 1c,d) with an average diameter size of 3.54±0.05 nm (FIG. 1e) recorded via high-resolution transmission electron microscope (HR-TEM). GQDs also show high crystalline lattice structure apparent from FFT (fast Fourier transform) images of the chosen area (FIG. 1f,g) along with distinguishable lattice fringes with a spacing of 0.24 nm (FIG. 1h) corresponding to graphite. Also, EDX (Energy-dispersive X-ray Spectroscopy) measurements are performed showing 83% (atomic percentage) carbon and 17% oxygen via elemental analysis (FIG. 2a) along with a mapping of scan area with the presence of carbon and oxygen (FIG. 2b,c,d). Additionally, Raman spectroscopic measurements show the D-band at ~1330 cm-1 indicating the presence of disordered structure and G-band at ~1604 cm-1 (FIG. 5a, b) corresponding to the SP2 hybridized carbons on the surface of both RGO and RGQDs. The ID/IG ratio increases from ~1.50 (RGO) to ~1.74 (RGQDs) (1.16 times) suggesting the increase of defects in the RGQDs graphitic structure induced scission and oxidation in the synthetic process.

Figure 4:
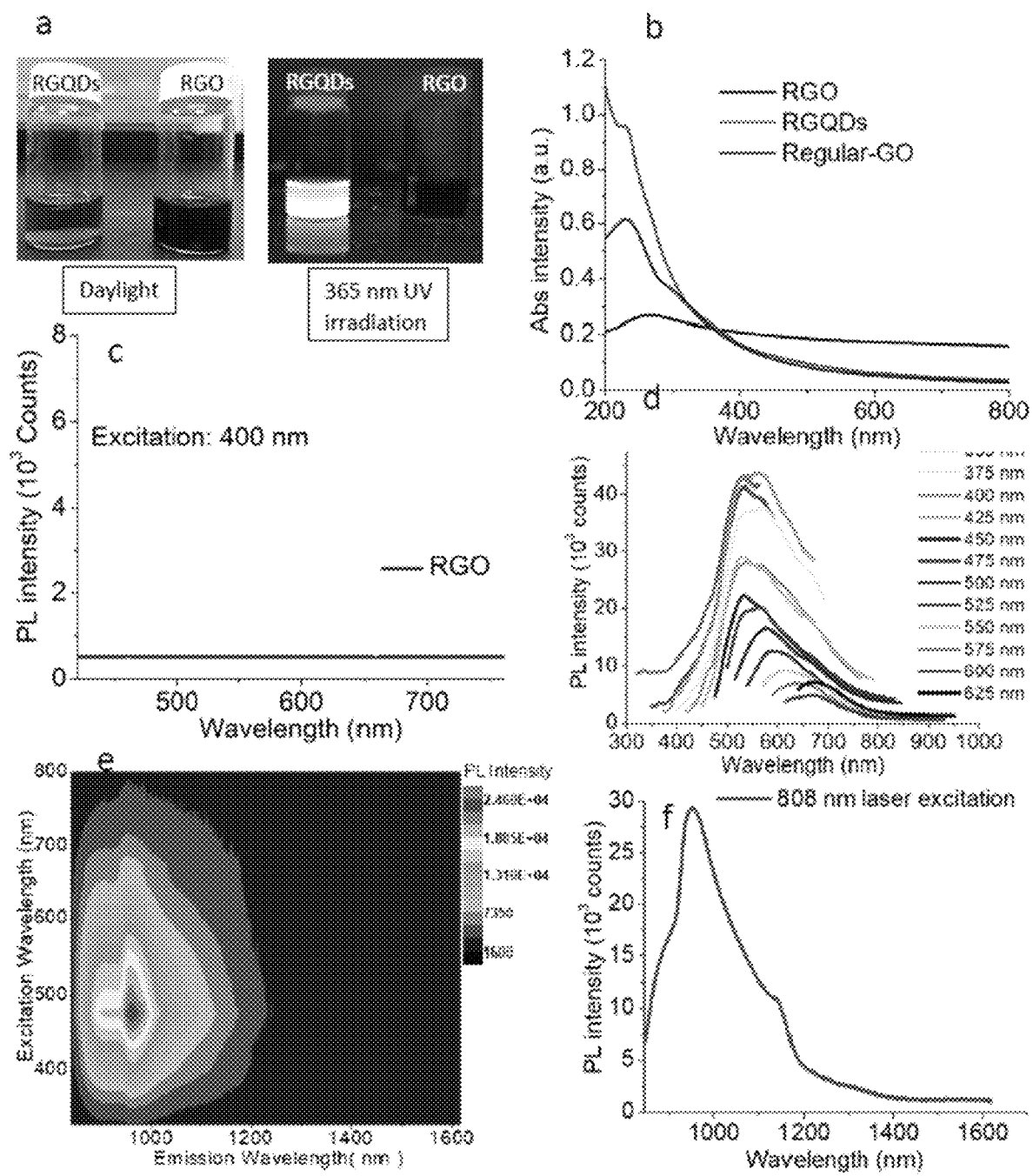
FIG. 4: (a) physical color of aqueous RGO/RGQDs under daylight and 365 nm UV excitation; (b) Absorbance spectra of RGO, GO, RGQDs; Fluorescence spectra of (c) RGO, (d) RGQDs in visible; (e) Photoluminescence excitation-emission map of RGQDs; (f) Near-IR emission from RGQDs at 808 nm laser excitation.

A dramatic change in color and solubility is observed before and after the reaction (FIG. 4a) indicating potential change in RGO electronic structure. In order to verify that, the optical properties of RGO/RGQDs are explored using fluorescence and absorption spectroscopy. RGO shows an absorption peak at ~280 nm corresponding to $\pi$ to $\pi^*$ transition of $sp^2$ graphitic carbon (FIG. 4b), whereas a blue-shifted peak at ~230 nm appeared for RGQDs which is similar to the $\pi$ to $\pi$ transition of C=C bond from graphene oxide (GO). However, GO shows a shoulder ~300 nm corresponding to C=O bond which is absent in RGQDs, suggesting different types/arrangements of oxygen-containing functional groups on RGQDs structure (FIG. 4b). Due to these changes in absorbance spectra, it is expected that the fluorescence properties of these materials will also be different. Although RGO did not exhibit any sign of fluorescence emission (FIG. 4c), RGQDs show mostly excitation-independent emission peaking at 532 nm with an excitation range of 300 to 475 nm and an excitation-dependent emission behavior at longer excitation wavelengths (FIG. 4d). This visible emission is most likely to be originated from size-dependent strong quantum confinement effects. The emission intensity decreases with the increase of excitation wavelength followed by red-shifted emission peaks with >475 nm excitation wavelength, suggesting the presence of different types/sizes of RGQD emissive species. Most interestingly, these RGQDs exhibit excitation-independent emission in the near infrared-I region peaking at ~950 nm, showing maximum emission with 475 nm excitation decreasing in intensity up to 800 nm excitation. However, with 808 nm laser excitation, RGQDs still exhibit bright fluorescence in the near-R region, indicating a potential as a near-IR emitting fluorophore for biological in-vitro/in-vivo/ex-vivo imaging applications.

The NIR emission can be attributed to the defect states created by the sodium hypochlorite reaction on the RGO surface. The quantum yield of RGQDs was measured using an integrating sphere with Spectralon coating, providing a quantum yield of 6.29% at 637 nm excitation and 1.34% at 808 nm excitation with maximum emission at 950 nm. The aqueous RGQDs were further imaged using a wavelength-resolved hyperspectral fluorescence microscopy showing bright emission at 950 nm with 808 nm laser excitation (FIG. 5a,b), which is similar to the fluorescence spectra of RGQDs, confirming that RGQDs can be imaged microscopically with excitation wavelength suitable for biological imaging applications.

Figure 8:
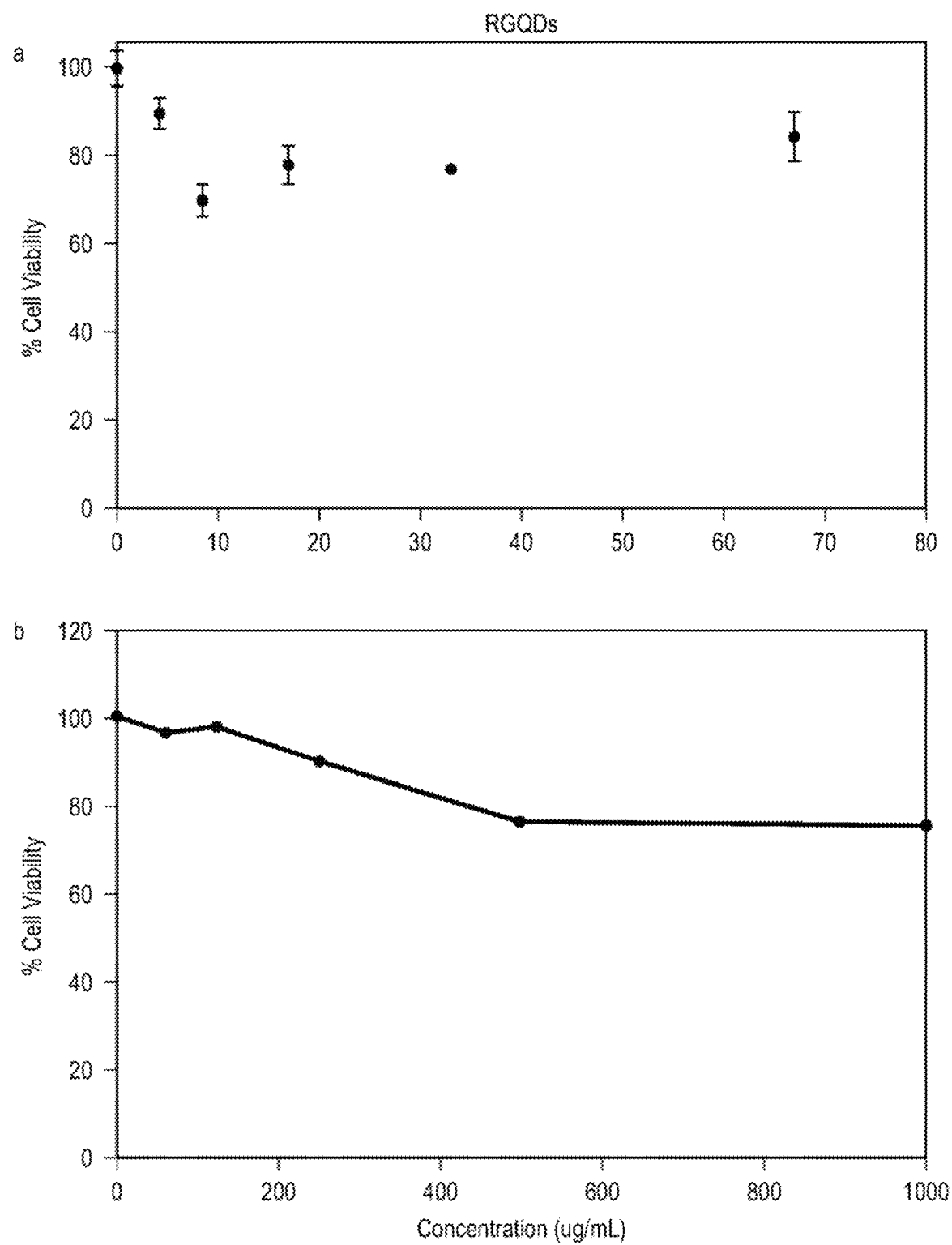
FIG. 8 shows cytotoxicity of RGQDs in HeLa cells showing percent cell viability at different RGQDs concentration assessed via (a) MTT assay (b) Luminescence-based assay.

In order to assess their potential in bioapplications, MT cytotoxicity assay was performed in HeLa cells showing significant cell viability (more than 80%) at a maximum concentration of 68 µg/ml (FIG. 8). As nanomaterials are known to interfere with the absorption-based MTT method, the RGQDs are first only tested at low concentrations. To assess the maximum RGQD concentration that can be used for bioimaging we further perform Luminescence cytotoxicity assay (FIG. 8) that indicates high (with ~80% cell viability) biocompatibility for RGQDs at concentrations up to 1 mg/mL. These concentrations were further used for in vitro and in vivo imaging experiments described in detail below.

Figure 6:
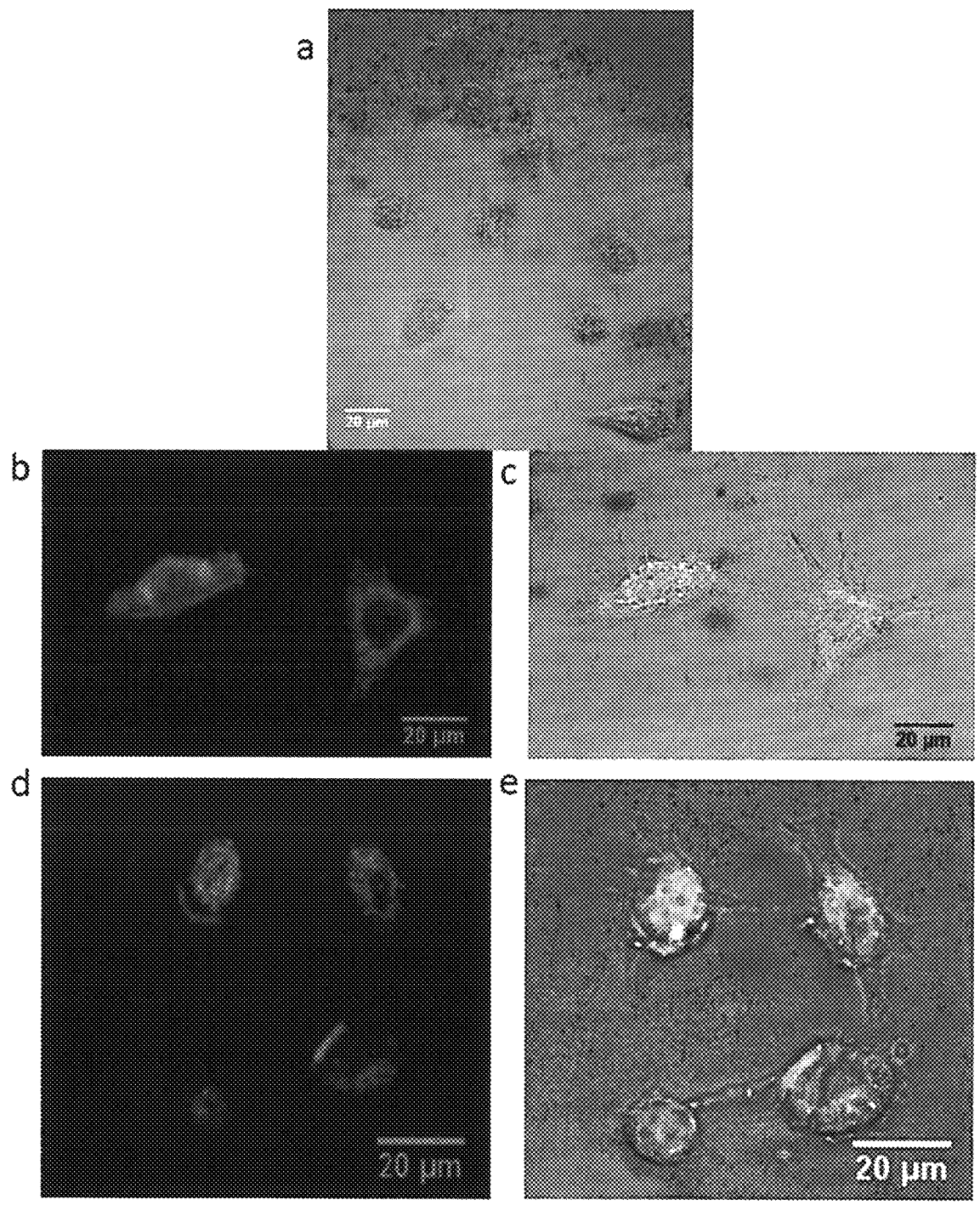
FIG. 6 shows brightfield/fluorescence overlay images of (a) untreated control HeLa cells, and cellular uptake of RGQDs imaged with 460 nm excitation at (b,c) 3 h, (cd) 12 h transfection points.
Figure 7:
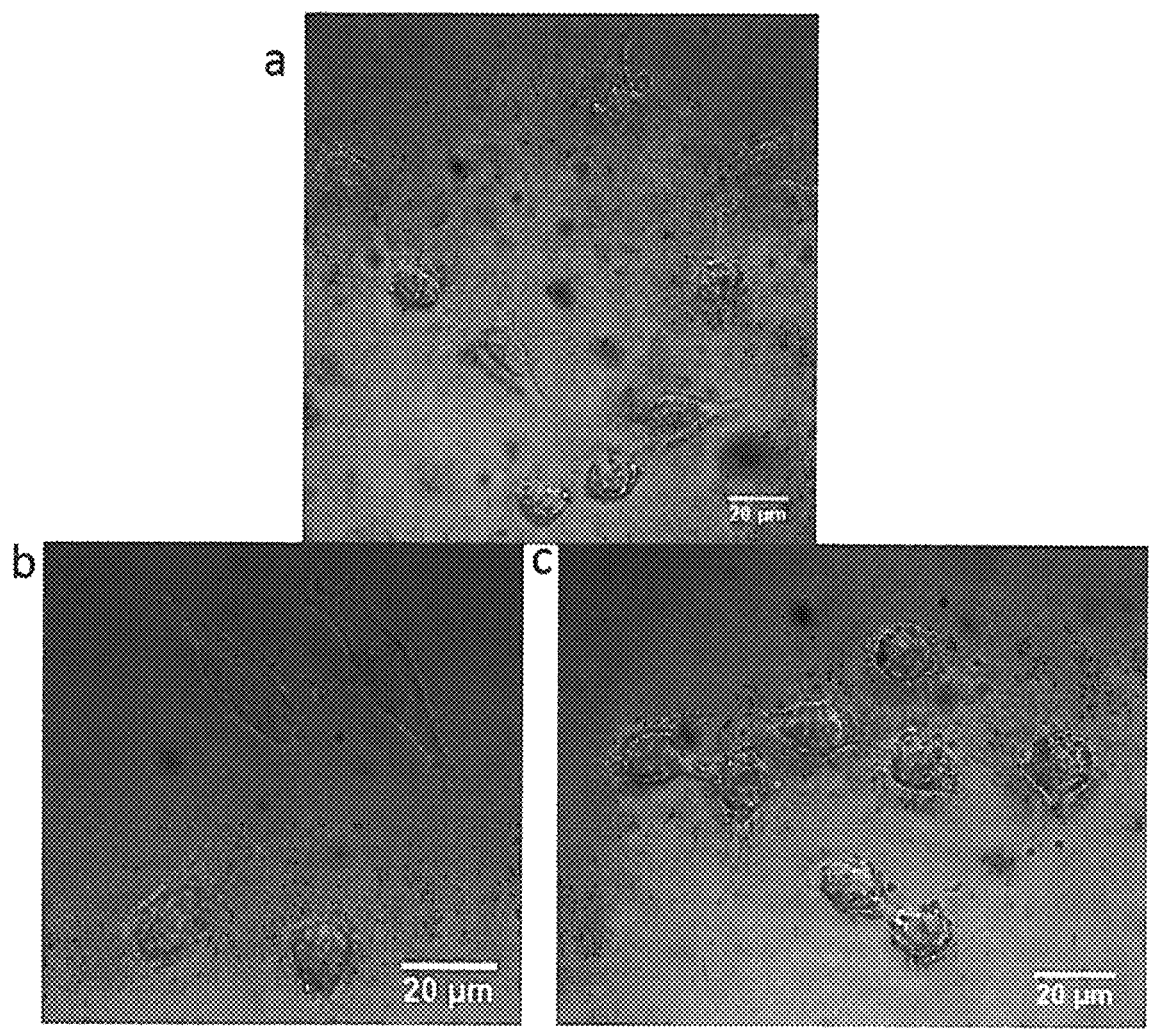
FIG. 7 shows brightfield/NIR fluorescence overlay images of (a) untreated control HeLa cells and cellular uptake of RGQDs imaged with 808 nm laser excitation at (b) 3 h, (c) 12 h transfection points.

As visible and NIR emission of RGQDs has a high potential for biomedical imaging applications, it was fully characterized and tested with confocal fluorescence microscopy imaging in vitro showing a bright intracellular fluorescence emission in green (550±20 nm) with 460±20 nm excitation (FIG. 6) and NIR-I (950 nm) with 808 nm laser excitation (FIG. 7), indicating substantial cellular internalization of RGQDs at 3 h and 12 h time points. As a result, RGQDs were effectively imaged in vitro both in the visible and near-IR regions, suggesting their potential as non-toxic NIR fluorescence probes as well as drug delivery vehicles.

Figure 9:
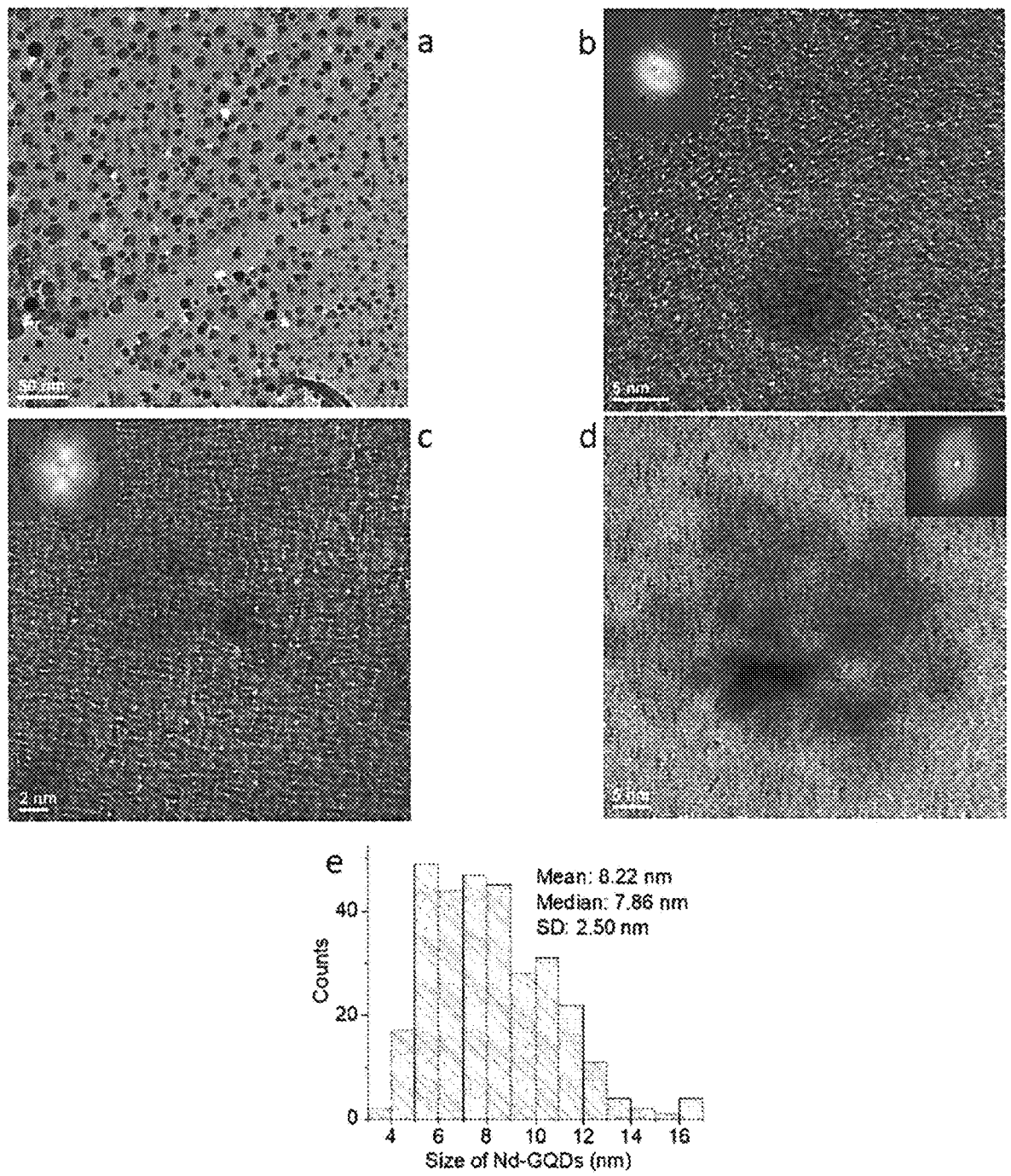
FIG. 9: (a) TEM images showing the distribution of neodymium-doped graphene quantum dots (Nd-GQDs) (b) HRTEM images of Nd-GQDs. Inset: FFT images of the chosen area. (c,d) HRTEM images of Nd-GQDs showing the possibility of formation of cluster of GQDs attached via $Nd^{3+}$ ions with each other, (e) Size distribution of Nd-GQDs.
Figure 10:
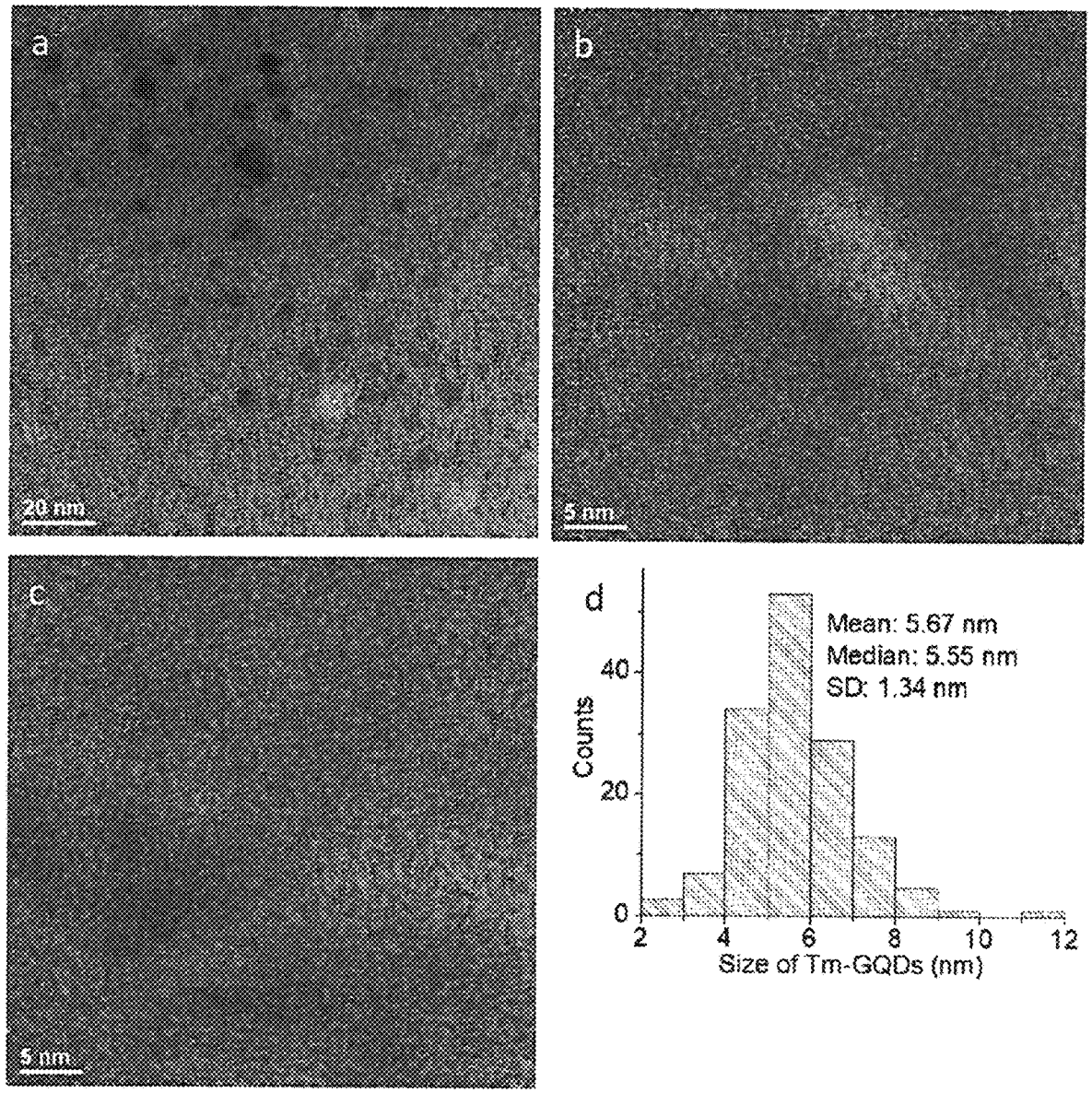
FIG. 10: (a) TEM images showing the distribution of Tm-GQDs (b) HRTEM images of Tm-GQDs. Inset: FFT images of the chosen area. (c) HRTEM images of Tm-GQDs showing the possibility of formation of cluster among GQDs attached via $Tm^{3+}$ ions, (d) Size distribution of Tm-GQDs.
Figure 11:
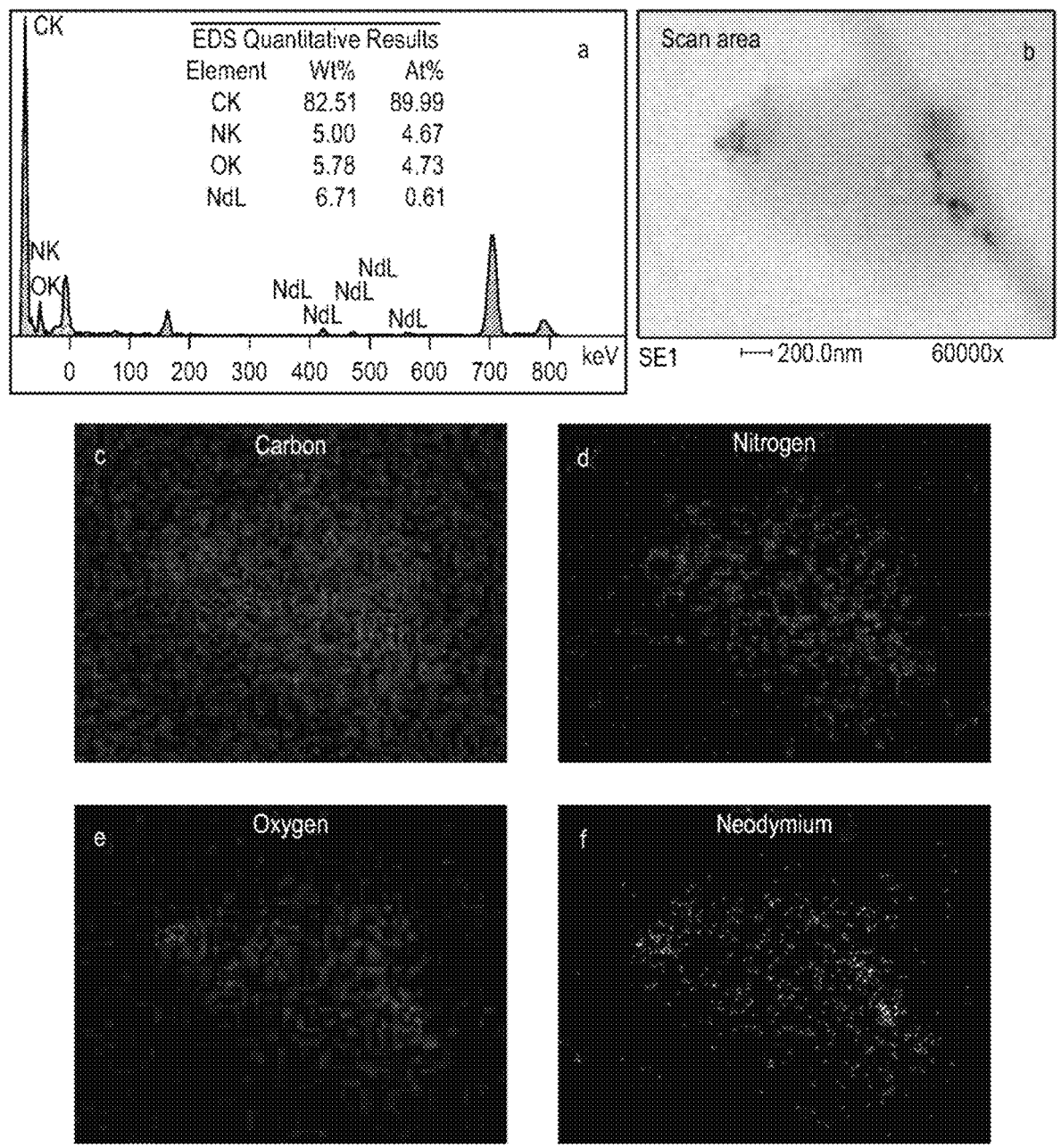
FIG. 11: (a) EDX spectra of Nd-GQDs. Inset: Atomic/weight percentage of Carbon/Oxygen/Nitrogen/Neodymium. EDX mapping of RGQDs showing (b) scan area, the presence of (c) Carbon, (d) Nitrogen, (e) Oxygen, (f) Neodymium.
Figure 12:
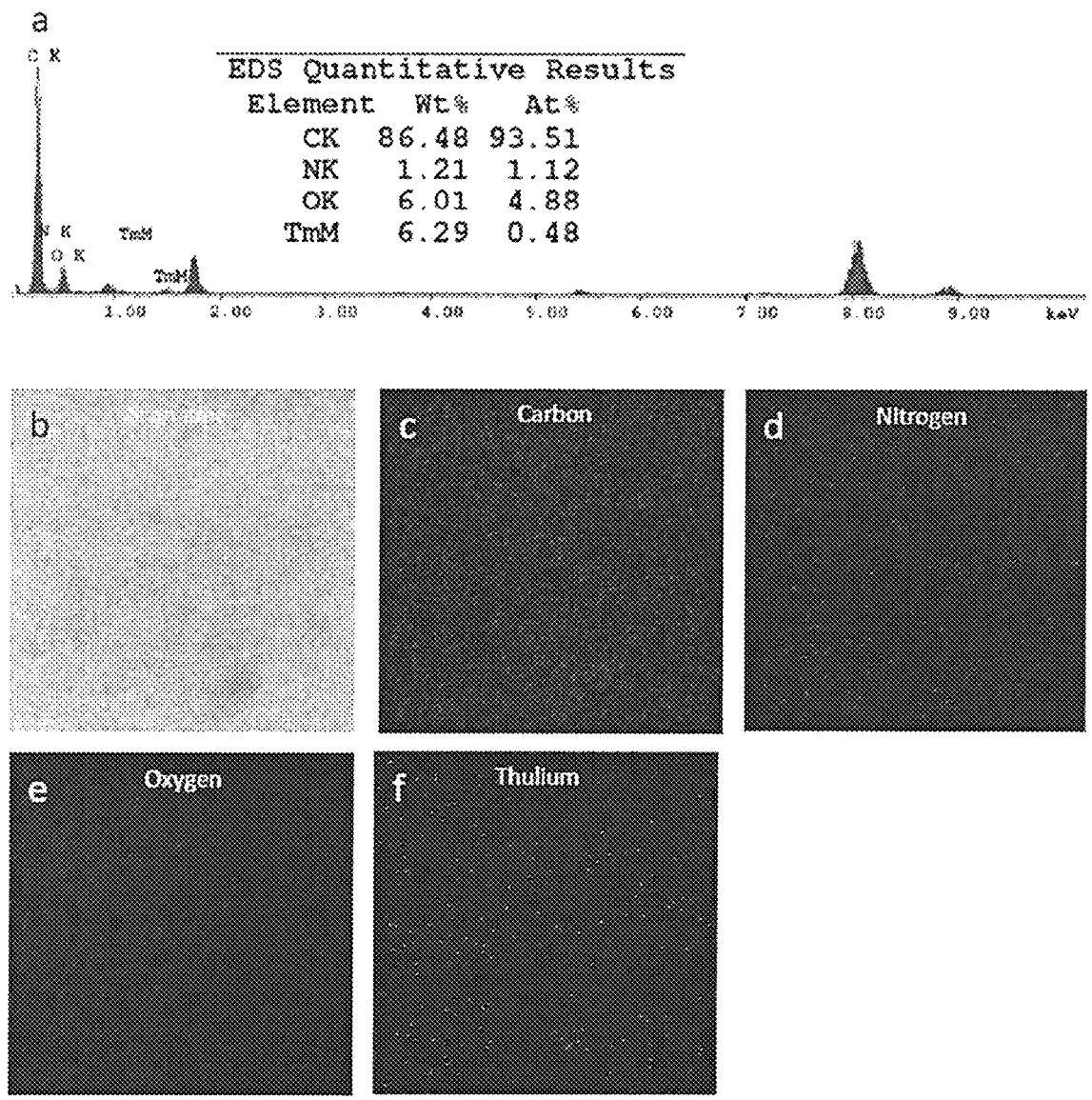
FIG. 12: (a) EDX spectra of Tm-GQDs. Inset: Atomic/weight percentage of Carbon/Oxygen/Nitrogen/Thulium. EDX mapping of Tm-GQDs showing (b) scan area of the mapping, the presence of (c) Carbon, (d) Nitrogen, (e) Oxygen, (f) Thulium.

Example 10: Neodymium/Thulium (Nd/Tm)-Doped GQDs Synthesized Via a Bottom-Up Approach A microwave-assisted hydrothermal method was utilized to prepare the Nd-GQDs (Neodymium(III)-doped graphene quantum dots) and Tm-GQDs (Thulium(III)-doped graphene quantum dots) using glucosamine as carbon precursor and Neodymium (III) nitrate hexahydrate/Thulium (III) acetate tetrahydrate for the doping with Nd3+/Tm3+ ions. Upon the microwave treatment, dehydration caused by hydrothermal reaction among glucosamine molecules takes place, forming polymers/aromatic clusters, followed by carbonization at a supersaturation condition with the doping of $Nd^{3+}$ (using Neodymium precursor)/$Tm^{3+}$ (using Thulium precursor) to yield either Nd-GQDs or Tm-GQDs, respectively. The Nd-GQDs/Tm-GQDs are further purified from unreacted precursor materials via the bag dialysis and filtered using 0.22 µm syringe filters to remove large clusters of GQDs. The purified/filtered product contains well-distributed graphene quantum dots (FIG. 9a, 10a) with an average diameter size of 8.12±0.12 nm (FIG. 9e) (for Nd-GQDs) and 5.67±0.10 nm (FIG. 10d) (for Tm-GQDs) analyzed via TEM images. The HRTEM images reveal the high crystalline nature of Nd-GQDs/Tm-GQDs along with discernible lattice fringes with a lattice spacing of 0.21 nm (FIG. 9,10b, c) corresponding to the (100) plane of graphene. The elemental analysis performed by EDX shows the following atomic percentages: 89.99% carbon, 4.67% nitrogen, 4.73% oxygen, 0.61% neodymium for Nd-GQDs (FIG. 11a); and 93.51% carbon, 1.12% nitrogen, 4.88% oxygen, 0.48% Thulium for Tm-GQDs (FIG. 12a). Additionally, the EDX elemental mapping confirms the presence of C/N/O/Nd for Nd-GQDs and C/N/O/Tm for Tm-GQDs (FIG. 11, 12b,c,d,e,f).

Figure 13:
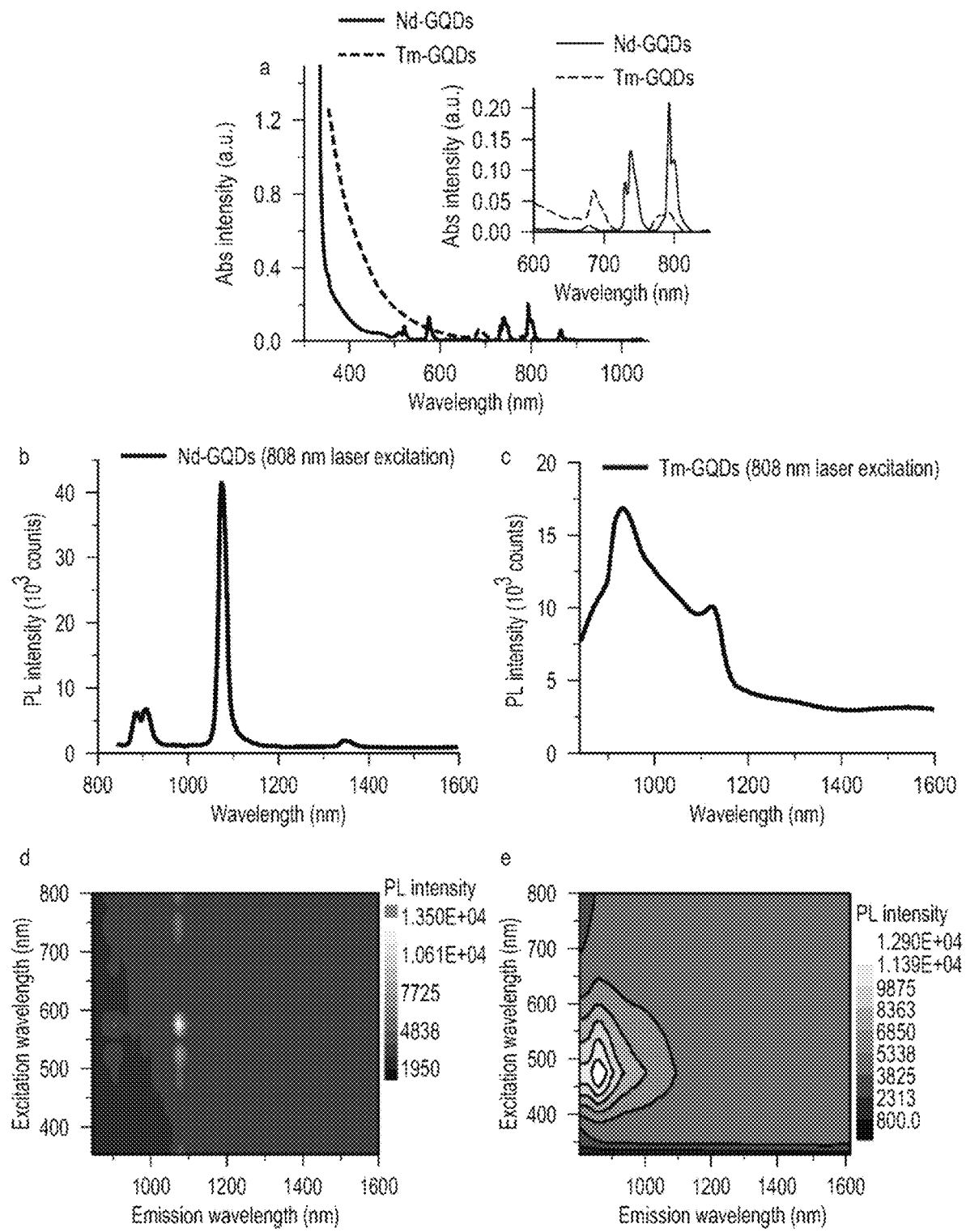
FIG. 13: (a) Absorbance spectra of Nd-GQDs/Tm-GQDs; Fluorescence spectra of (b) Nd-GQDs, (c) Tm-GQDs at 808 nm laser excitation; Photoluminescence excitation-emission map of (d) Nd-GQDs; (e) Tm-GQDs.

The optical properties of Nd-GQDs/Tm-GQDs are studied further via absorption and fluorescence spectroscopy, showing the intense absorption peak at ~800 nm attributed to $^4I_{9/2} \rightarrow ^4F_{5/2}$ transition of $Nd^{3+}$ (Nd-GQDs) and $^3H_6 \rightarrow ^3H_4$ transition of $Tm^{3+}$ (Tm-GQDs) (FIG. 13a). Also, other absorption peaks for Nd-GQDs at 521, 576, 731, 739 nm can be attributed to multiple $f^5$-$f^5$ transitions and for Tm-GQDs at ~685 nm can be assigned to the electronic transitions of $^3H_6$ ground state to $^3F_{2,3}$ higher energy states (FIG. 1a). While GQDs without rare earth doping show high yield brad visible emission, upon doping with neodymium/thulium trivalent ions GQDs exhibit characteristic NIR emission peaking at 900, 1060, 1330 nm with 808 nm CW (continuous wave) laser excitation (FIG. 13b) corresponding to the transitions of $^4F_{3/2} \rightarrow ^4I_{9/2}$, $^4F_{3/2} \rightarrow ^4I_{11/2}$, $^4F_{3/2} \rightarrow ^4I_{13/2}$ of those, respectively. Also, Tm-GQDs exhibit bright emission ~900 nm which is potentially a transition $^3H_4 \rightarrow ^3H_6$ of $Tm^{3+}$ red-shifted due to the interaction between oxygen/nitrogen-containing functional groups and $Tm^{3+}$ ions (FIG. 13c). Photoluminescence excitation-emission map shows excitation-independent fluorescence for both types of GQDs with maximum emission intensity at 575 nm excitation for Nd-GQDs and 475 nm excitation for Tm-GQDs (FIG. 13d,e).

Figure 14:
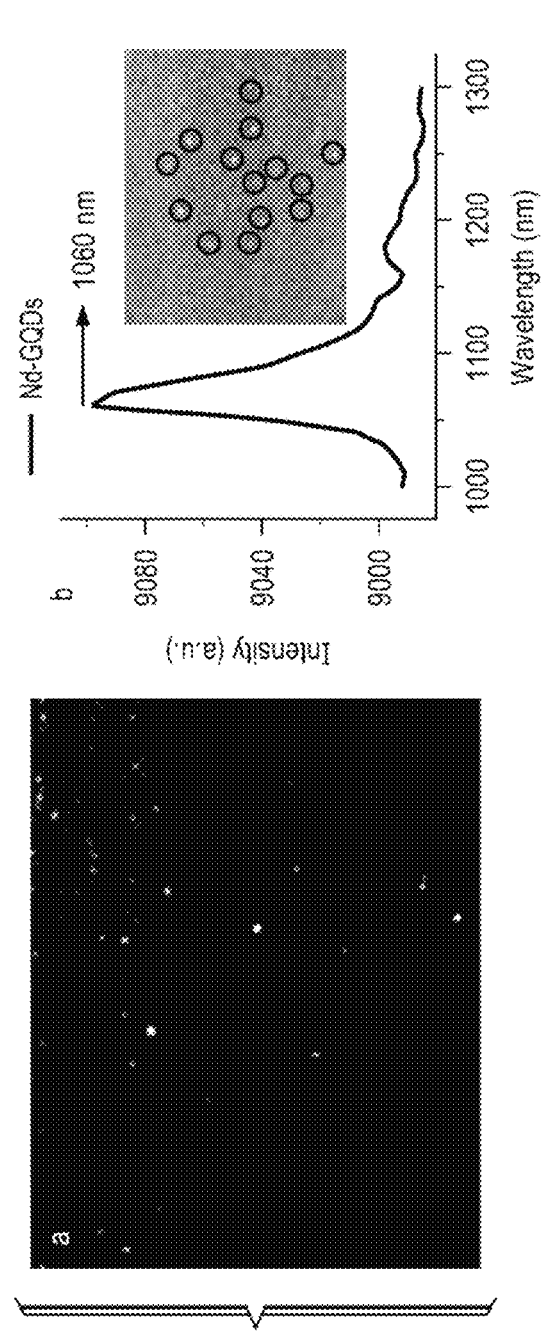
FIG. 14: Hyperspectral fluorescence images of Nd-GQDs utilizing the (a) broadband mode, (b) inset: bandpass mode. Recovery of the spectra from the fluorescence images showing NIR emission peaking at 1060 nm.
Figure 15:
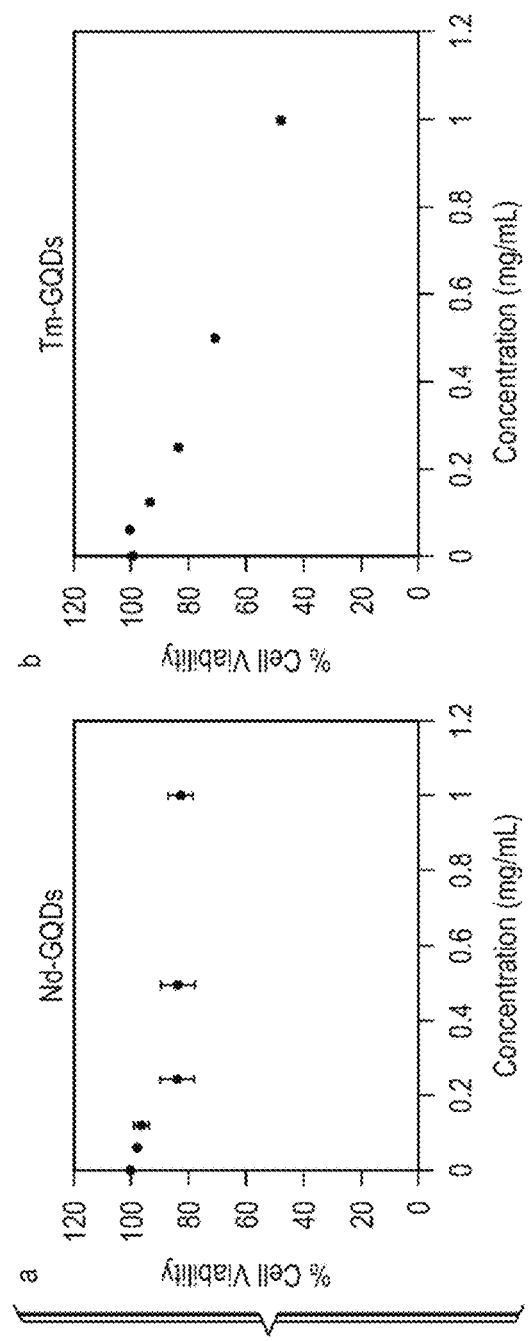
FIG. 15: Cytotoxicity of (a) Nd-GQDs, (b) Tm-GQDs in HeLa cells showing percent cell viability at different Nd-GQDs/Tm-GQDs concentration. Error bars are within the points for Tm-GQDs.
Figure 16:
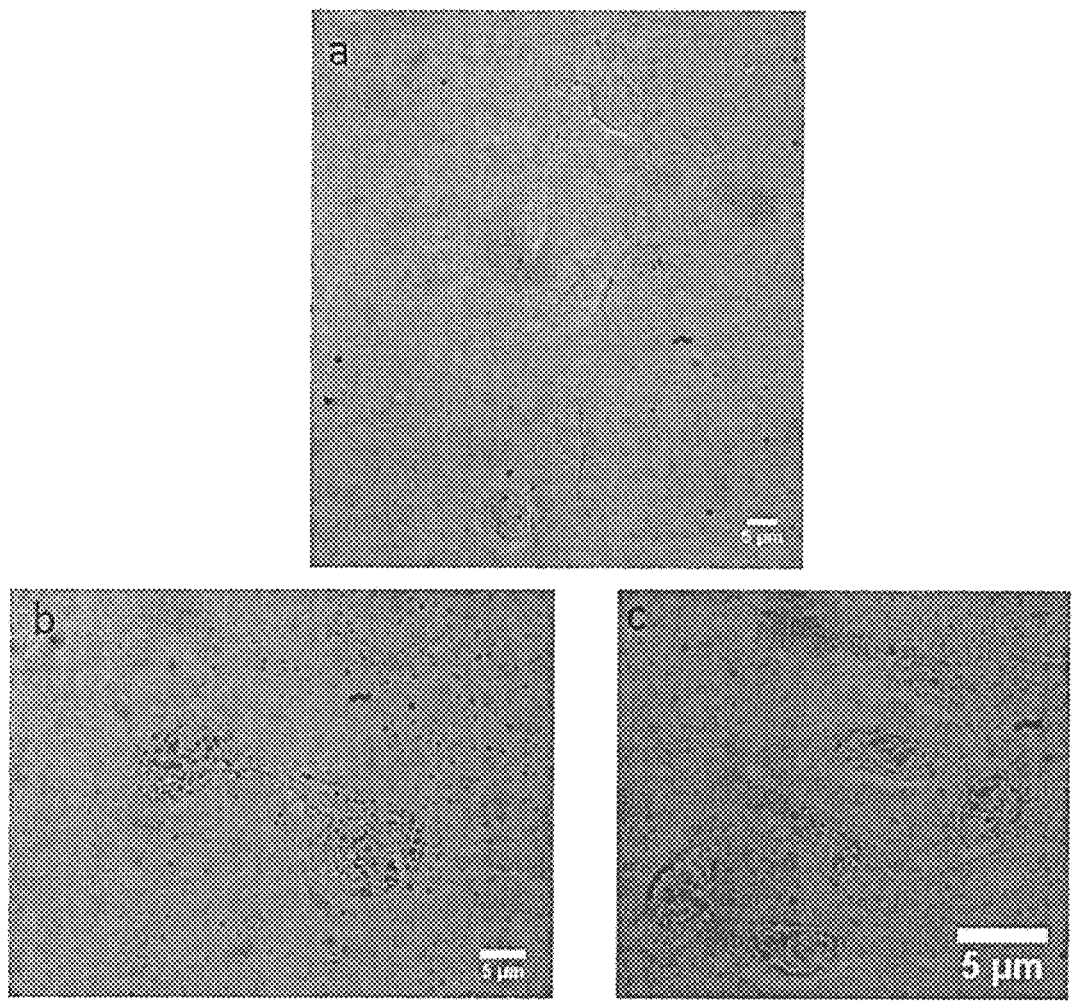
FIG. 16: Brightfield/NIR fluorescence overlay images of (a) untreated control HeLa cells; cellular uptake of (b) Nd-GQDs, (c) Tm-GQDs with 12 h incubation time imaged at 808 nm excitation.

The aqueous Nd-GQDs were further imaged under the microscope using a hyperspectral imager to scan the whole NIR emission range. Spectrally-resolved imaging yields Nd-GQD emission at 1060 nm with 808 nm laser excitation, which is present in the fluorescence spectral measurements of Nd-GQDs with the same excitation (FIG. 14a,b). Tm-doped GQDs show emission on the microscopic level as well. This indicates their capacity for biological imaging with both excitation and emission in the NOR range. In order to check the biocompatibility of Nd-GQDs/Tm-GQDs, a cytotoxicity study was undertaken via MIT cytotoxicity assay using HeLa cells and showing >80% cell viability at a high concentration of 1 mg/mL (FIG. 15a) for Nd-GQDs and 0.25 mg/mL for Tm-GQDs (FIG. 15b) sufficient for in-vitro cellular imaging. In this work, in vitro fluorescence studies are performed with near-infrared (InGaAs, ZEPHIR™ 1.7, Photon etc) cameras, which allows spectrally resolved imaging in the near-infrared region enabled by a Photon etc. NIR hyperspectral imager. Wavelength-resolved images were recorded in the NIR with 808 rum laser excitation allowing for imaging of Nd-GQDs and Tm-GQDs specifically at 1060 and 925 nm, respectively. Hyperspectral imaging allows to record fluorescence images at the particular GQD emission wavelengths, thus, spectrally filtering biological autofluorescence. As a result, substantial fluorescence from Nd-GQDs/Tm-GQDs (FIG. 16b,c) was observed within the cells indicating the successful internalization of both GQDs with no emission detected outside the cells, whereas untreated control sample did not show any autofluorescence (FIG. 16a). This indicates the capacity of Nd-GQDs/Tm-GQDs as non-toxic probes for effective NIR biomedical imaging.

RGQDs, Nd-GQDs and Tm-GQDs synthesized in this work by using a simple, scalable, cost-effective, eco-friendly process are unique nanomaterials that combine high biocompatibility with the potential for NIR bioimaging desired for high tissue penetration and low autofluorescence/scattering in the NIR, while this functionalized platform provides the means of drug attachment and delivery.

Example 11: In Vivo Study

Figure 17:
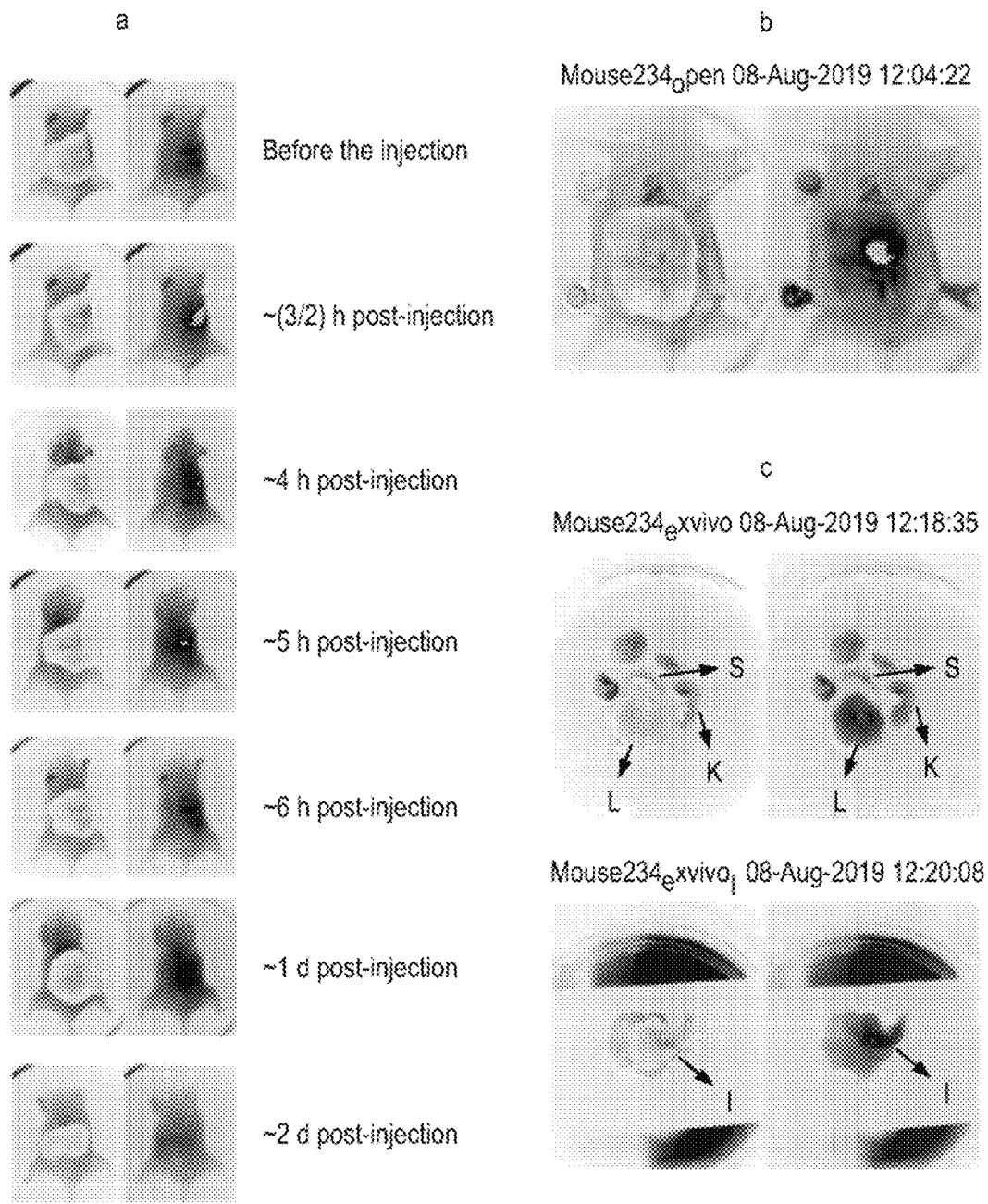
FIG. 17: Brightfield/NIR fluorescence overlay images (left image) and color-coded (right image) images of a live sedated mouse in ventral position performed with 808 nm laser excitation and 900 nm long-pass filter (a) before the intravenous injection of the mouse and whole body distribution of Tm-GQDs in mouse after maximum up to 2 days of post-injection (b) image of a Tm-GQDs treated and post-sacrificed dissected mouse (c) ex-vivo images showing the fluorescence of Tm-GQDs in liver (L), kidney (K), spleen (S), and intestine (I) performed with 808 nm laser excitation and 900 nm long-pass emission filter.

To verify the potential of the rare earth metal-doped GQDs for in vivo NIR imaging a qualitative biodistribution assessment based on the Tm-GQDs fluorescence is performed in a small mouse model. The Tm-GQDs are injected intravenously through the tail vein and imaged in live sedated mice with diffuse 808 nm CW laser excitation using Roper Scientific InGaAs 2D array camera with 900 nm long-pass emission filter directed onto the sedated mouse. While the non-treatment control animals show negligible autofluorescence in the NIR (FIG. 17a), the mice injected with Tm-GQDs display significant emission after 1.5 h post-injection at different organ sites mainly observable at the intestine (I), kidney (k), spleen (S), and liver (L) (FIG. 17a). The Tm-GQD fluorescence intensity decreases with time and becomes negligible after two days post-injection suggesting excretion of quantum dots over time. In order to have clear observation of the emission sites, the animals are sacrificed and dissected, showing intense emission from the intestine along with a significant fluorescence signal from liver/kidney/spleen sites (FIG. 17b). Additionally, the ex-vivo imaging is performed on individual extracted organs showing the accumulation of Tm-GQDs in the spleen, kidney, liver, and intestine (FIG. 17c). This broad biodistribution suggests for a range of potential imaging/drug delivery targets accessible by the Tm-GQDs even with an untargeted approach.

An invention has been provided with several advantages. The GQD's manufactured by the methods of the invention show promise as potential agents for drug/gene delivery and bio-imaging applications, among others. The manufacturing methods used to produce the GQD's of the invention are generally less costly and less complex than prior art methods used to produce fluorescing GQD's. The GQD's of the invention fluoresce in the near-infrared NIR-I and NIR-II regions, unlike the prior art materials, many of which required UV/VIS excitation. Emissions in the near-infrared (NIR) region offer the possibility of a broader range of potential applications, particularly in the bio-medical arena, offering lower scattering and absorption in tissues where biological auto-fluorescence is minimal. The GQD's of the invention should offer improved biocompatibility over known prior art materials lessening the possibility of potential immunogenic responses or accumulation-derived toxicity.

What is claimed is:

1. A method for producing a near-infrared emitting graphene quantum dot, the method comprising the steps of:
    forming a homogenous suspension of water, reduced graphene oxide in a concentration of 0.2 mg/ml and 1.5 ml of a 5 volume % solution of sodium hypochlorite;
    then exposing/irradiating the suspension with UV radiation of 302 nm for 2 hours to thereby form a graphene quantum dot;
    wherein the graphene quantum dot so formed exhibits fluorescence emission in the near-infrared region.

2. The method for producing the graphene quantum dot of claim 1, wherein the graphene quantum dot formed has a diameter between 1 nanometer and 10 nanometers.

3. The method for producing the graphene quantum dot of claim 2, wherein the graphene quantum dot formed has an atomic percentage of carbon ranging from 50% to 90% and an atomic percentage of oxygen ranging from 10% to 50%.

4. A method for producing a near-infrared emitting graphene quantum dot, the method comprising the steps of:
    forming an aqueous solution of 0.04 M glucosamine or glucosamine hydrochloride and an 0.008 M aqueous solution of $Nd(NO_3)_3 \cdot 6H_2O$;
    microwaving the aqueous solution for 60 minutes at 1000-2000 W to thereby form a graphene quantum dot;
    wherein the graphene quantum dot so formed exhibits fluorescence emission in the near-infrared region.

5. The method for producing the graphene quantum dot of claim 4, wherein the graphene quantum dot so formed has a diameter between 2 nanometers and 20 nanometers.

6. The method for producing the graphene quantum dot of claim 5, wherein the graphene quantum dot so formed has an atomic percentage of carbon ranging from 50% to 99.5%, an atomic percentage of oxygen ranging from 0.5% to 50%, an atomic percentage of nitrogen ranging from 0% to 50%, and an atomic percentage of a metal ranging from 0% to 20%.

7. A method for producing a near-infrared emitting graphene quantum dot, the method comprising the steps of:

forming an aqueous solution of 0.04 M glucosamine or glucosamine hydrochloride and an 0.009 M aqueous solution of $Tm(COOCH_3)_3 \cdot 4H_2O$;

microwaving the aqueous solution for 60 minutes at 1000-2000 W to thereby form a graphene quantum dot;

wherein the graphene quantum dot so formed exhibits fluorescence emission in the near-infrared region.

8. The method for producing the graphene quantum dot of claim 7, wherein the graphene quantum dot so formed has a diameter between 2 nanometers and 20 nanometers.

9. The method for producing the graphene quantum dot of claim 8, wherein the graphene quantum dot so formed has an atomic percentage of carbon ranging from 50% to 99.5%, an atomic percentage of oxygen ranging from 0.5% to 50%, an atomic percentage of nitrogen ranging from 0% to 50%, and an atomic percentage of a metal ranging from 0% to 20%.

* * * * *